United States Patent [19]
Rose

[11] Patent Number: 5,533,470
[45] Date of Patent: *Jul. 9, 1996

[54] ELECTRONIC NOSE-CLIP WITH SOLAR CELL

[76] Inventor: Andrew F. Rose, P.O. box 1751, Cody, Wyo. 82414

[*] Notice: The term of this patent shall not extend beyond the expiration date of Pat. No. 5,307,759.

[21] Appl. No.: 233,317

[22] Filed: Apr. 26, 1994

Related U.S. Application Data

[63] Continuation-in-part of Ser. No. 895,879, Jun. 9, 1992, Pat. No. 5,307,759, which is a continuation-in-part of Ser. No. 726,353, Jul. 5, 1991, abandoned.

[51] Int. Cl.⁶ .............................. A01K 3/00; A01K 15/04
[52] U.S. Cl. ............................ 119/721; 119/908; 340/573
[58] Field of Search ...................... 119/721, 720, 119/759, 908, 866; 340/573

[56] References Cited

U.S. PATENT DOCUMENTS

| | | | |
|---|---|---|---|
| 3,589,337 | 6/1971 | Doss | 119/721 |
| 3,897,753 | 8/1975 | Lee et al. | 119/721 |
| 4,898,120 | 2/1990 | Brose | 119/721 |
| 4,967,695 | 11/1990 | Giunta | 119/721 |
| 4,996,945 | 3/1991 | Dix | 119/721 |
| 5,121,711 | 6/1992 | Aine | 119/721 |
| 5,370,082 | 12/1994 | Wade | 119/859 |

FOREIGN PATENT DOCUMENTS 884638 11/1981 U.S.S.R. .............................. 119/866

*Primary Examiner*—John G. Weiss

[57] ABSTRACT

An animal training apparatus including a nose-supported housing, receiver, control circuit, and electrodes. The receiver cooperates with the carrrier signal from a transmitter, activating a control circuit. The control circuit engages an indicator level module or control level module to activate animal control output in the form of electrical stimulus within and across the nasal septum. When an animal enters an area where the received carrier signal creates a d.c. output less than a threshold reference level, the control circuit is activated. An outfitted animal is trained to develop a behavioral condition in response to an indicator level output followed by a stronger control level output. A particular embodiment is the combination with a solar cell attached to the housing to maintain a charged state in a battery that powers the receiver and control circuit.

14 Claims, 4 Drawing Sheets

ELECTRONIC NOSE-CLIP WITH SOLAR CELL

This application is a continuation-in-part of in my earlier application Ser. No. 07/895,879, filed Jun. 9, 1992, titled "Electronic Noseclip for Animal Control," now U.S. Pat. No. 5,307,759, which is a continuation-in-part application of my earlier application Ser. No. 07/726,353, filed Jul. 5, 1991, titled "Animal Control Device," now abandoned.

BACKGROUND OF THE INVENTION

The present invention relates to wireless control of animals in which a receiver and control circuit are located in a nose-clip. Animals wearing the invention are constrained to remain within an area defined by a transmitted lobe of radiation. The improvement includes a technique to maintain a full state of charge to a battery in which extended life permits operation over a longer period of time than previously.

DESCRIPTION OF THE PRIOR ART

Heretofore, radio signal lobes of radiation are used to activate various animal-borne receivers and warning devices to exclude the animals from entering the lobe of radiation. Additionally, animal-borne devices are activated as an animal should wander to an area in which the received field strength is above or below a predetermined threshold level. My previous application describes a nose-supported apparatus activating upon receiving a signal.

At this time, there does not appear to be any related art for devices that are nose-supported and operated by remote (wireless). There are devices which are nose-supported to serve as a means to identify the animal, assist in weaning, retrieve metallic objects from feed, and to apply medicant via nasal membranes.

SUMMARY OF THE INVENTION

The primary object is the inclusion of a solar cell for charging a battery in the nose-clip. As power demands are great, the size of housing must be minimized, and the apparatus must operate over extended periods, the ability to self-charge from a solar cell becomes desirable. A typical selenium cell for power applications can be expected to produce approximately 90 milliwatts of DC power per 6.25 square cm (one square inch) of photoactive surface area exposed to light. Typically, solar cells are flatplate structures, brittle, and sensitive to impact. As cattle wearing the invention will normally be outdoors continuously, the utilization of a solar cell becomes apparent.

A second object is to provide a reduction in power use from the disclosure of my previous application. The prior application provides a device to apply stimulus in relation to power received from a transmitter. This lacks efficiency in that an animal may tolerate an "indicator level" stimulus at the expense of battery life. A control circuit that is either "on or off" would be more efficient, reducing power demands and prolonging battery life.

A third object is to provide an improved system of operation in a nose-supported receiver and control circuit. The present invention will constrain animals to remain within a lobe of radiation or within an area where the received radiation correlates to levels above or below a reference level voltage. Further, as the size of the lobe is adjusted the animals will reposition. This has some advantages in certain grazing situations such as concentrated rotational grazing of dairy cattle. This may also be beneficial in open range grazing by reducing the number of transmitters to achieve herding.

DESCRIPTION OF THE PREFERRED EMBODIMENTS OF THE INVENTION

Figure 1:
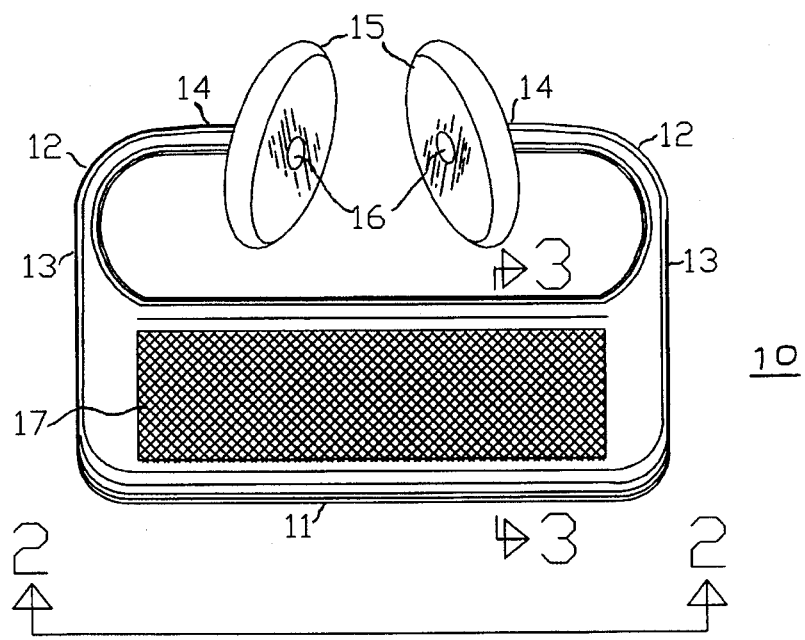
FIG. 1 is a diagram of a Nose-Clip viewed from the front.
Figure 2:
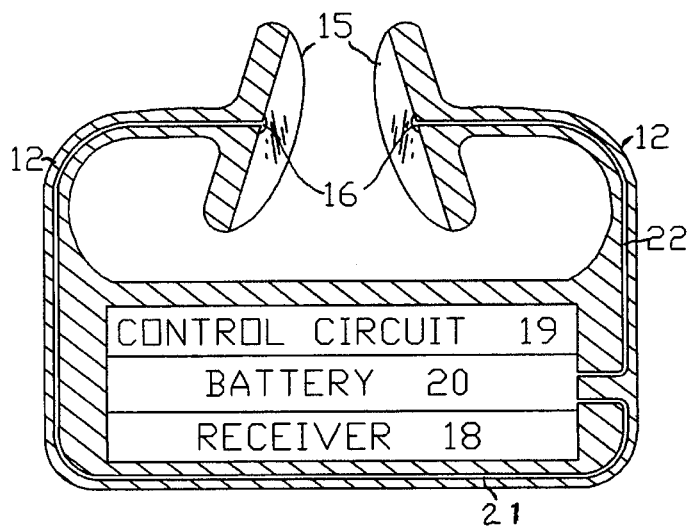
FIG. 2 is a sectional view of cutting plane 2—2 of FIG. 1.

Referring now to FIGS. 1–4 there is shown an apparatus incorporating embodiments of the present invention. FIG. 1 is a view of the invention generally showing a housing 10. The housing 10 contains a receiver 18 (FIG. 2) and control circuit 19 (FIG. 2). Housing 10 includes a barrel 11, bows 12, first end 13, second end 14, and pads 15. Also shown are electrically-conductive disks 16 attached to each of the pads 15. The view is from the front of an animal which would be wearing housing 10 on the nose. Barrel 11 is preferably a conventional cylindrical shape, yet may deviate to accomodate the structure of the nose or to minimize rotation vertically. The first end 13 of each bow 12 is affixed to a end of barrel 11. Each bow 12 then extends away from barrel 11 towards the other bow 12. Pads 15 are individually attached to the second end 14 of each bow 12, defining a space therebetween the pads 15 for receiving the nasal septum of the nasal cavity of an outfitted animal 38 (FIG. 5). Pads 15 are oriented for a firm anatomical fit with the nasal septum of the nasal cavity. The size, shape and orientation of the above mentioned parts, and in particular the angle of tilt of the pads 15 may be adjusted to account for varying anatomical and biological characteristics among various species or ages of animals. When attached to an animal such as a cow or bison the barrel 11 bears against the front of the nose between each nostril. Generally, the pads 15 are flat or maintain a slight bulge on the portion which rests against the nasal septum. The housing 10 may be formed from a variety of materials but preferably is an engineering plastic such as acetal resin. The pads 15 may be formed from a material which deforms with time to provide a fit adapted to the particular individual outfitted.

The pads 15 may be surfaced with a smooth material to minimize mechanical strain against the nasal septum if the housing 10 should rotate. This material may be the acetal resin housing 10 is formed, or it may be a silicon or material with a lubricisity. Disks 16 are of approximately 20 mm diameter and negligible thickness, serving to conduct stimulus shocks from electrodes 21 and 22 (FIG. 2) to the nasal septum. An alternative to disks 16 may be to surface the pads 15 with a conductive epoxy.

Figure 3:
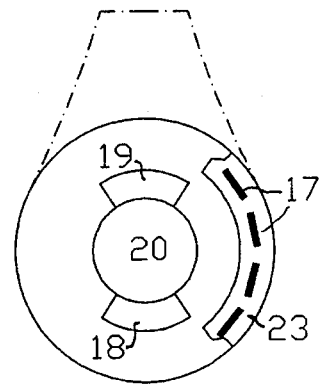
FIG. 3 is a sectional view of cutting plane 3—3 of FIG. 1.

Solar cells 17 are connected in series and positioned within housing 10 by a translucent epoxy 23 (FIG. 3).

Referring now to FIG. 2 is shown a view in section along cutting plane 2—2. Receiver 18, control circuit 19 and battery 20 are shown generally as positioned in housing 10. Electrodes 21 and 22 connect control circuit 19 with the disks 16.

Referring to FIG. 3 is shown a view in section along cutting plane 3—3. Receiver 18, control circuit 19 and battery 20 are shown generally as positioned in housing 10. Solar cells 17 are shown as positioned in epoxy 23. The epoxy 23 is attached by mechanical or chemical bond with the housing 10. Epoxy 10 protects solar cells 17 from impact, abrasion, and moisture.

Figure 4:
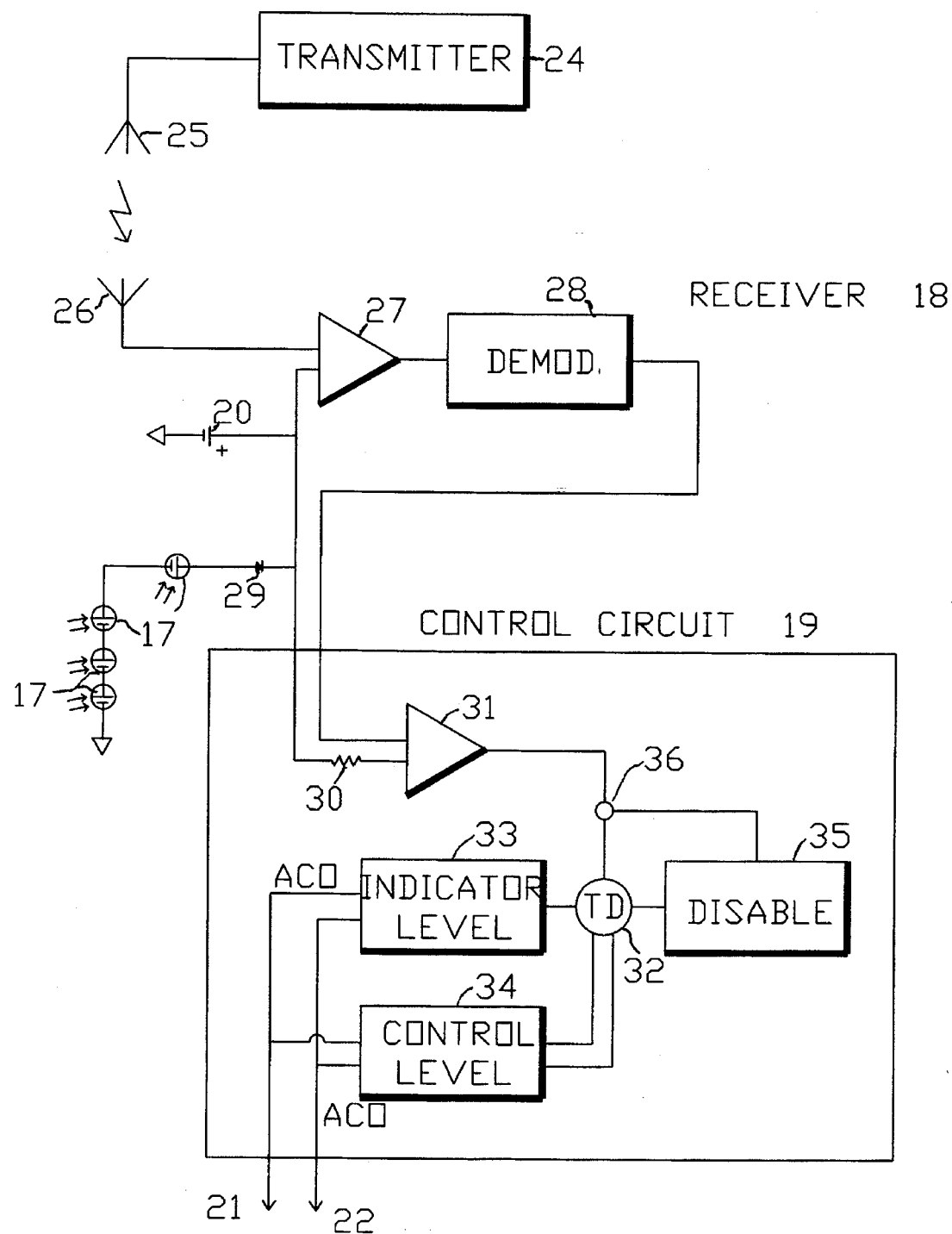
FIG. 4 is a schematic block diagram of the electrical components of the Nose-Clip of FIG. 1.
Figure 5:
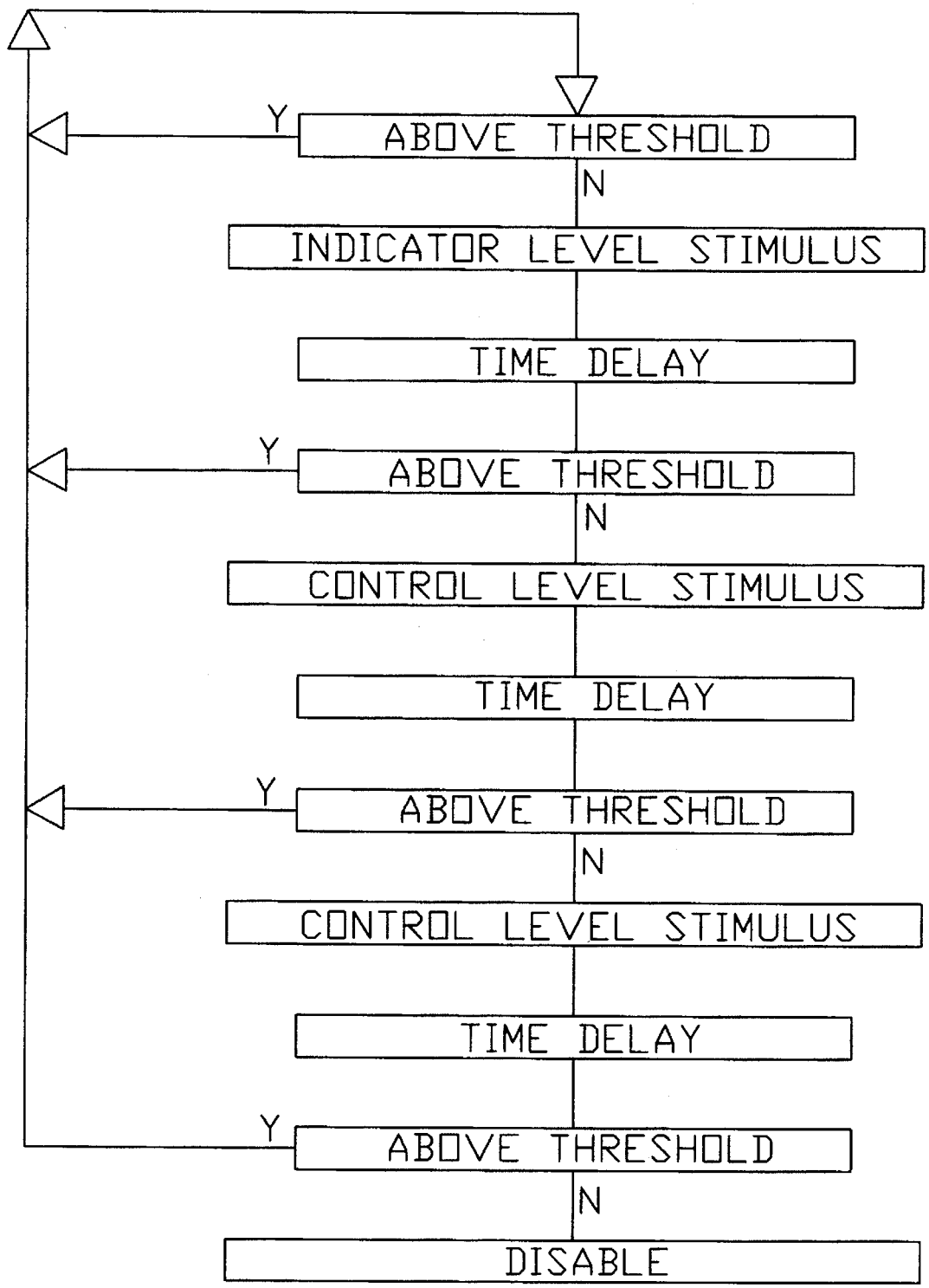
FIG. 5 is a flow, chart diagram showing activation of animal indicator level and control level stimulus in response to a signal below a threshold level.

Referring to FIG. 4 is shown transmitter 24 and antenna 25. Transmitter 24 feeds a modulated carrier signal $f_m$ to antenna 25 which creates radiation in a circular lobe 37 (FIG.5). The field strength of lobe 37 decreases with distance from transmitter 24. Receiver 18 is contained within a nose-supported housing 10 attached to animal 38. At receiver 18, lobe 37 is captured by an omnidirectional antenna 26 and then amplified by amplifier 27. The amplifier 27 is connected to and powered by battery 20. The modulated carrier signal $f_m$ is rectified and filtered in demodulator 28 to produce a d.c. signal output. This d.c. signal output is proportional to the intensity of the radiation lobe 37 received by receiver 18. The d.c. signal output is fed to control circuit 19.

Connected in parallel with battery 20 are solar cells 17. Solar cells 17 convert light into voltage and act to charge battery 20. Diode 29 is positioned to prevent reverse-biasing solar cells 17 from the voltage of battery 20. Battery 20 powers receiver 18 and control circuit 19.

In control circuit 19 is shown resistor 30 positioned to create a reference signal. At comparator 31 the d.c. signal output of demodulator 28 is compared against the reference signal. As animal 38 may wander relative to lobe 38, the produced d.c. signal will fall below (or above) the reference signal. Comparator 31 then outputs a signal to a time delay control switch 32. Control switch 32 activates an indicator level module 33 in which an animal control output (ACO) is administered to animal 38. The ACO is an electrical stimulus of characteristic to capture the attention of animal 38. At the same instant an internal time delay in control switch 32 is triggered. This time delay is of duration in which animal 38 has opportunity to return to an area from which it wandered, wherein the produced d.c. signal will fall above the reference signal.

If after the time delay the d.c. signal is still below the reference signal, indicating the animal has not changed course, control switch 32 activates a control level module 34 in which a second, stronger animal control output (ACO) is administered to animal 38. The second ACO is an electrical stimulus of objectional characteristic to animal 38. A second time delay is triggered by control switch 32 in which time the animal 38 again has opportunity to return to the area from which it wandered.

If after the second time delay, the produced d.c. signal is still below the reference signal, control switch 32 reactivates control level module 34 in which again the second ACO is administered to animal 38. At the same instant a third time delay in control switch 32 is triggered. If after the third time delay the d.c. signal is still below the reference signal, control switch 32 activates disable module 35. Disable module 35 disengages any further actions of control switch 32 through switch 36. A schematic representation of the operation of control circuit 19 is shown as FIG. 5.

Figure 6:
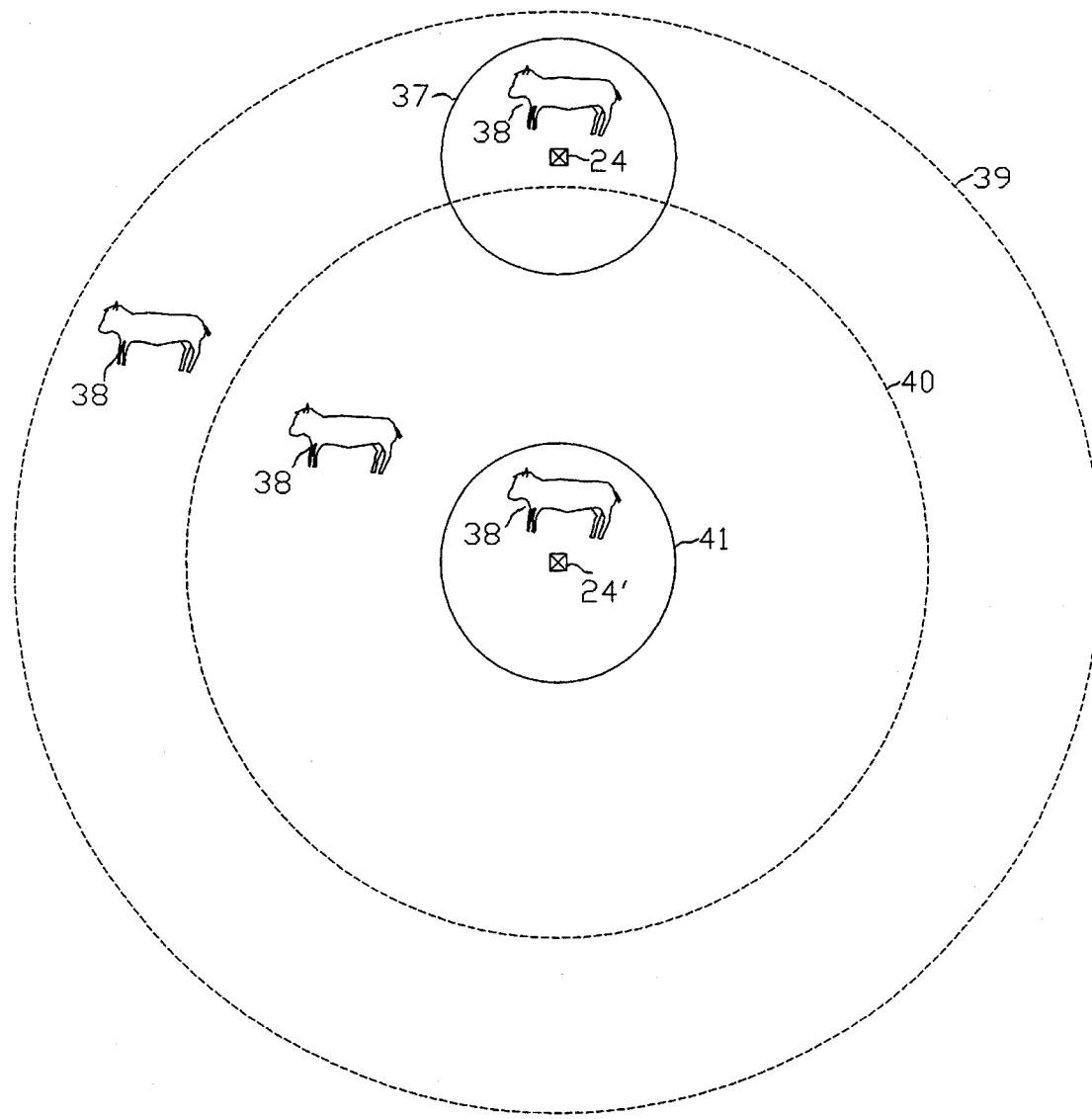
FIG. 6 is a schematic plan view of a pasture depicting an embodiment of the present invention.

Referring now to FIG. 6 is shown the invention in operation on a typical pasture. Transmitter 24 emits an omnidirectional (360 degree) radiation signal represented by lobe 37. Animal 38 located within lobe 37 will not receive any stimulus as the produced d.c. signal at comparator 31 is greater than the reference signal. As animal 38 strays outside the lobe 37 the pattern of stimulus of FIG. 4 is activated. A typical response at the indicator level ACO is a blink of the eye or very slight head movement. The response at the control level ACO is for animal 38 to pull the head upwards, then turning right, left, or stepping backwards. The result is to constrain animal 38 to remain within lobe 37. After several encounters of stimulus the behavior is modified, wherein animal 38 will require only an indicator level ACO to remain within lobe 37.

A further embodiment is described in which a second transmitter 24' is activated to transmit lobe 39 while simultaneously transmitter 24 is turned off. This is preferably accomplished remotely. Animal 38 is now within lobe 39 and may readily move to alternative positions not frequented previously and will receive no stimulus. Gradually, transmitter 24' reduces the size of lobe 39 to that of lobe 40 and subsequently to that shown as lobe 41. Animal 38 is induced to move to the new position represented in lobe 41. As an encouraging inducement for animal 38 to relocate to within lobe 37, transmitter 24' may emit an audible tone which is deemed soothing or an attractant for animal 38. Lobe 41 is equal in size to original lobe 37 but is positioned as indicated in FIG. 6. While this representation is with a single animal, it is under;stood that a herd will be outfitted with housing 10. Although the prefered stimulus administered to the nose is electrical, it is understood that audible, mechanical or scents may be applied.

The above discussion and enclosed figures provide a clear and concise description of what is to be claimed. Therefore, I claim the following:

1. An animal control apparatus for use with a transmitter comprising:

a nose-supported housing adapted to be attached to the nose of an animal;

a receiver contained within the housing, adapted to cooperate with the signal of such a transmitter, to produce a d.c. signal output;

stimulus means contained within the housing to apply a stimulus to the nose of the animal in response to the d.c. signal output of the receiver;

a battery contained within the housing, connected as a voltage source to the receiver and the stimulus means; and, a solar cell affixed to the housing and connected with the battery.

2. The apparatus of claim 1, wherein the nose-supported housing comprises; a barrel;

two bows with a first and second end on each bow, a first end of each bow affixed to a end of the barrel, each bow extending away from the barrel towards the other bow;

a separate pad attached to the second end of each bow defining a space therebetween the pads for receiving the nasal septum of the nasal cavity of the animal.

3. The apparatus of claim 2, wherein the pads are a deformable material, which adapts to the structure of the nose of the animal.

4. The apparatus of claim 1, wherein the receiver comprises;

a omnidirectional antenna for receiving a modulated carrier signal produced by such a transmitter;

a amplifier connected with the antenna, to amplify the signal; and, a demodulator connected with the amplifier to rectify and filter the amplified signal, producing the d.c. signal output proportional to the field strength of the signal from such transmitter.

5. The apparatus of claim 4, wherein the stimulus means includes a control circuit comprising;

a resistor connected in series with the battery to produce a reference signal;

a comparator to compare the d.c. signal output against the reference signal;

a time delay control switch connected with the output of the comparator;

a indicator level module connected with the control switch, to produce a animal control output;

a control level module connected with the control switch, to produce a stronger animal control output;

a disable module connected with the control switch;

a pair of electrodes connected to the control circuit, attached to the housing, terminating at the pads; and, a pair of electrically-conductive disks connected to the electrodes, attached to the pads.

6. The apparatus of claim 5, wherein such a transmitter emits a soothing audible tone.

7. The apparatus of claim 1 including a plurality of the solar cell connected in series.

8. The apparatus of claim 7, including;

epoxy encasement of the solar cell, the epoxy attached by mechanical interlock with the housing.

9. An animal control apparatus for use with a transmitter comprising:

a nose-supported housing adapted to be attached to the nose of an animal;

a receiver contained within the housing, adapted to cooperate with the signal of such a transmitter; and, stimulus means attached to the housing for applying a stimulus to the nose of the animal in response to the cooperation of the receiver.

10. The apparatus of claim 9, wherein the nose-supported housing comprises; a barrel;

two bows with a first and second end on each bow, a first end of each bow affixed to a end of the barrel, each bow extending away from the barrel towards the other bow;

a separate pad attached to the second end of each bow defining a space therebetween the pads for receiving the nasal septum of the nasal cavity of the animal.

11. The apparatus of claim 10, wherein the pads are a deformable material, which adapts to the structure of the nose of the animal.

12. The apparatus of claim 9, wherein the receiver comprises;

a battery;

a omni-directional antenna for receiving a modulated carrier signal produced by such a transmitter;

a amplifier connected with the antenna, to amplify the signal; and, a demodulator connected with the amplifier to rectify and filter the amplified signal, producing a d.c. signal output proportional to the field strength of the signal from such transmitter.

13. The apparatus of claim 12, wherein the stimulus means includes a control circuit comprising;

a resistor connected in series with the battery to produce a reference signal;

a comparator to compare the d.c. signal output against the reference signal;

a time delay control switch connected with the output of the comparator;

a indicator level module connected with the control switch, to produce a animal control output;

a control level module connected with the control switch, to produce stronger animal control output;

a disable module connected with the control switch;

a pair of electrodes connected to the control circuit, attached to the housing, terminating at the pads; and, a pair of electrically-conductive disks connected to the electrodes, attached to the pads.

14. A method to train an animal to move relative to a predetermined area, the method comprising the steps of:

applying a stimulus of a first magnitude to the nose of the animal; and, applying a stimulus of a second magnitude to the nose of the animal.

* * * * *